United States Patent [19]

Baumgartner

[11] 4,056,084
[45] Nov. 1, 1977

[54] APPARATUS FOR RECYCLING EXHAUST

[75] Inventor: Hans Baumgartner, Viersen, Germany

[73] Assignee: A. Pierburg Autogeratebau KG, Neuss, Germany

[21] Appl. No.: 699,635

[22] Filed: June 24, 1976

[51] Int. Cl.² ............................................. F02M 25/06
[52] U.S. Cl. ................................................ 123/119 A
[58] Field of Search .................................... 123/119 A

[56] References Cited

U.S. PATENT DOCUMENTS

| 3,820,514 | 6/1974 | Kuehl | 123/119 A |
| 3,877,452 | 4/1975 | Nohira et al. | 123/119 A |
| 3,878,823 | 4/1975 | Vartanian | 123/119 A |
| 3,901,203 | 8/1975 | Pozniak | 123/119 A |
| 3,926,161 | 12/1975 | Wertheimer | 123/119 A |

FOREIGN PATENT DOCUMENTS 2,365,341    5/1973    Germany .......................... 123/119 A Primary Examiner—Wendell E. Burns
Attorney, Agent, or Firm—Haseltine, Lake & Waters

[57] ABSTRACT

An apparatus for recycling exhaust gas for reducing noxious portions in the exhaust gases of an internal combustion engine, wherein the flow of exhaust gas between an exhaust gas tapping point on the exhaust manifold and a tapping point on the intake manifold is controlled by an EGR-valve subjected to a controlled suction pressure at the intake manifold through the intermediary of a pressure converter, such that the amount of exhaust gas recycled at low engine loads is proportionately reduced in relation to engine mixture rate to provide a lower ratio of recycled gas to mixture rate at low loads as compared to the ratio at high loads.

11 Claims, 11 Drawing Figures

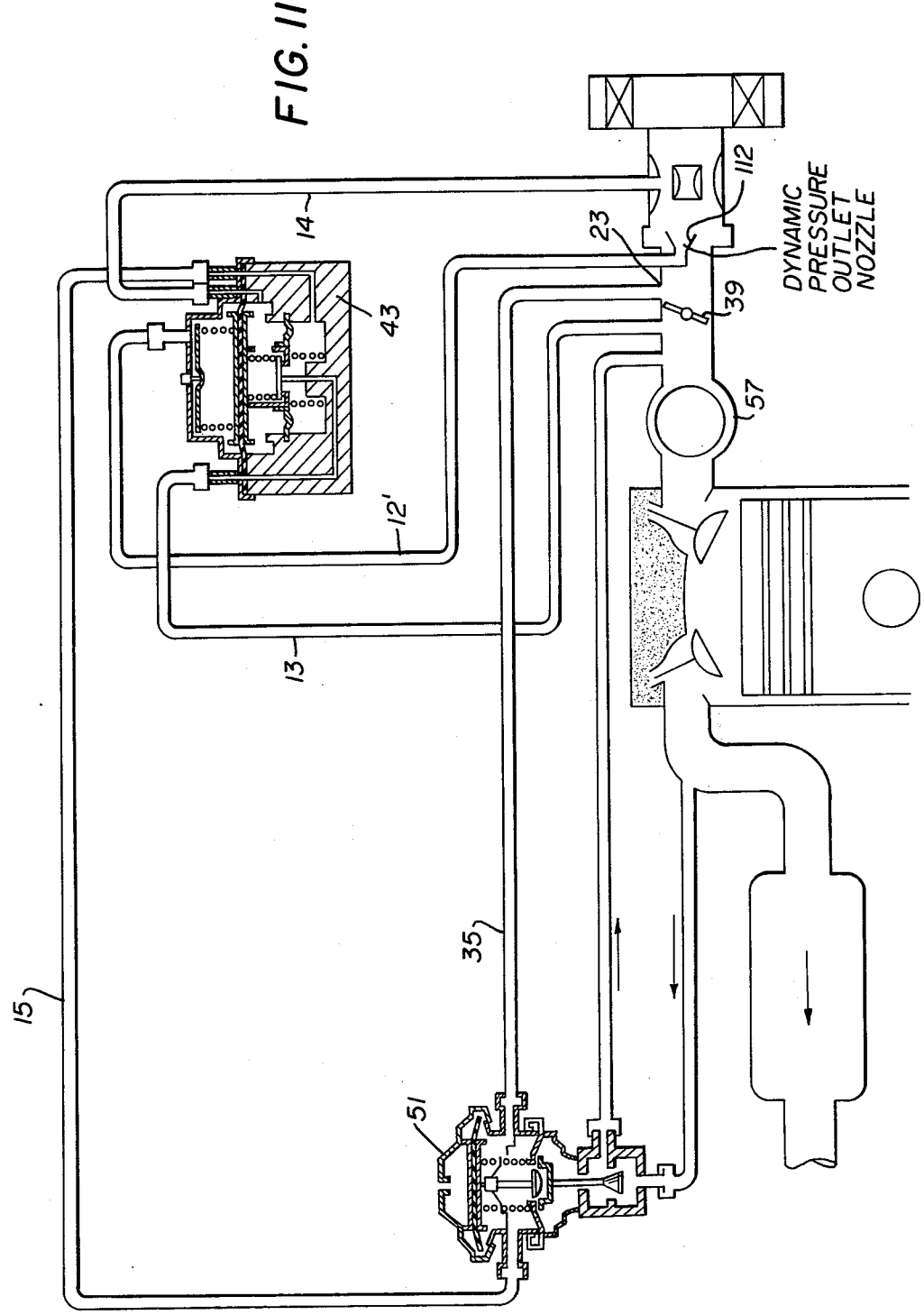

APPARATUS FOR RECYCLING EXHAUST

FIELD OF THE INVENTION

The present invention relates to apparatus for the return or recycling of exhaust gas for the purpose of reducing noxious portions in the exhaust gases of internal combustion engines, wherein the cross section of the flow passage through a valve, disposed between a tapping point on the exhaust manifold and a tapping point on the inlet manifold, is controlled as a function of the weight rate of exhaust flow through the internal combustion engine.

BACKGROUND OF THE INVENTION

A highly effective measure of reducing the unhealthy portions contained in the exhaust gas of an internal combustion engine, and more particularly for reducing the nitrogen oxide gas portions, is effected by recycling certain amounts of the exhaust gas. This addition of gases, which does not participate in the combustion process, produces a reduction of the combustion temperature, so that less nitrogen oxide occurs. However, this inert gas causes a reduction of cylinder filling with the air mixture, hereafter termed mixture at full loads, thereby adversely affecting the rotation of the engine at low rates of speed which is particularly evident during idling of the engine. Therefore, in order to maintain the maximum power output at full load, and to provide smooth rotation of the engine during idling, no recycling or return of exhaust gas should take place at there lower speeds of rotation. Moreover, the emission of exhaust gas is only limited during engine idling because the fuel rate and cylinder filling are both low; moreover, the combustion temperatures are lower, and accordingly also the emission of nitrogen compounds. In intermediate load ranges, however, the emission of nitrogen compounds is particularly high and therefore particularly dangerous because the engine usually operates in city traffic in (for which the emission control regulations are usually the most stringent) during intermediate load ranges. It is desirable, moreover, for the recycling of the exhaust gas to be interrupted temporarily during short-time full loads as they occur, for example, when passing another automobile. On the other hand, the emission control regulations are less stringent for highway driving which may require maximum power output under full loads without an accumulation of noxious discharge gases.

For satisfying the above requirements, a device is known from German published patent application (DOS) No. 23 38 906 which comprises the use of a vacuum amplifier for the purpose of providing a controlled vacuum for the EGR-valve. This device, in addition to requiring a vacuum supply reservoir, has the drawback that the amounts of exhaust gas returned within the lower load ranges at high suction or underpressures in the suction conduit are excessively high.

SUMMARY OF THE INVENTION

It is an object of the present invention to provide a device permitting a substantial reduction of the nitrogen oxide emission while at the same time only minimally increasing the fuel consumption, and impairing, as little as possible, the performance of the engine and vehicle and only minimally influencing other noxious emissions, for example of hydrocarbons.

According to the invention, this object is achieved by reducing the amount of exhaust gas returning through said EGR-valve at lower loads of the internal combustion engine as compared to higher loads, i.e. as distinct from a constant ratio between recycled exhaust gas and mixture flow rate of the internal combustion engine, and by controlling by means of a valve, the amount of returned exhaust gas at increasing mixture flow rates such that said amount of exhaust gas returned increases proportionally to the increase in mixture flow rate. This is achieved by means of a pressure converter.

The device comprises within an EGR-valve, a reducing diaphragm between a cutoff diaphragm and a working diaphragm, said reducing diaphragm being acted on its upper side by the suction conduit underpressure acting on the cutoff diaphragm, and on its underside by the regulating underpressure of a pressure converter acting on said working diaphragm; said cutoff diaphragm being rigidly connected to a coupling rod by means of a diaphragm dish, said diaphragm dish serving as an abutment for a cutoff spring which on the other side is supported in the clamping plate of the reducing diaphragm, and said reducing diaphragm being rigidly connected at its inner clamping edge to said working diaphragm by a push rod by means of a pot; and wherein there is provided on said coupling rod on said one side a working spring supported at one end on a spring dish, and at its other end to said working diaphragm in a coupling pot which under controlled conditions is freely movable above said coupling rod.

In order to increase the closing effect in accordance with the invention, or to achieve a closing effect, a closing body is disposed on said push rod in the direction of flow upstream of the valve opening.

The arrangement for increasing the regulating pressure is provided in such a manner that the pressure converter has a primary diaphragm which is acted upon on its upper side by the exhaust gas counter pressure, and which is rigidly coupled by means of a coupling member with a secondary diaphragm having a smaller surface area, said diaphragms being oppositely loaded by an adjusting spring and a pressure spring; and a valve arrangement disposed in the clamping dishes holding said secondary diaphragm, the valve plate of said valve arrangement resting in the stationary condition of one valve spring on an outer valve seat disposed in the lower diaphragm dish, and on an inner valve seat connected with the valve housing, the underpressure of the suction conduit being supplied to the feeding line to said inner valve seat, and a controlling pressure is applied to said outer valve seat by a conduit; and the regulating conduit or line is communicatively connected to the secondary space, said regulating line discharging the regulating pressure formed in the pressure converter.

To satisfy specific requirements, the controlling pressure is tapped by way of said line upstream of the throttle valve instead of providing external ventilation of the intermediate diaphragm space.

The controlling pressure may be influenced or regulated in another way, namely by tapping the controlling pressure from the air throat or barrel of the carburetor. It is, furthermore, deemed useful if a fixed throttle is inserted in said line.

A special advantage of the system of the present invention is that it permits the return or recycling of substantial amounts of exhaust gas while the mixture flow rate of the engine is constant, thus within the characteristic engine field a line of constant induction within the range of flow suction pipe underpressure, and thus at high load, which amounts are then reduced with the decline in load and increasing underpressure in the suction pipe.

The reduction of the amount of recycled exhaust gas in the range of low loads takes into consideration, on the one hand, that because of low media pressures under these operating conditions of the engine, lower combustion temperatures and thus smaller amounts of nitrogen oxide occur, while on the other hand, a substantially higher amount of exhaust gas is returned for higher loads due to the lower proportion of inert gases as would be the case, for example, with the same output, and thus in the first approximation with also the same mixture flow, but higher media pressures.

Said adjustment of the return characteristics to the requirements of the engine achieves, particularly, increase of fuel consumption and the occurrence of other noxious substances are maintained at minimal values.

Another special property of this recycling or return system is that the amount of exhaust gas returned in the process can be adapted particularly well to the engine conditions during nonstationary operation. During engine accelerations, the amount of recycled exhaust gas is raised above the amount returned during stationary engine operation, and reduced below said value under engine braking or coasting conditions, thus during the delay phase, which results in a particularly favorably reduction of the substantial amounts of nitrogen oxide occurring during engine accelerations, while, however, both the driving characteristics and the fuel consumption during constant driving conditions are impaired only to the smallest possible extent.

The reduction of the amount of exhaust gas returned during coasting conditions also effects a minimal increase in fuel consumption, and only a minimal occurrence of other noxious emissions under said operating conditions.

Another possible way of achieving the objects of the invention is in connection with the afore-described pressure converter namely by disposing in an EGR-valve above a working diaphram, a spring-loaded reducing diaphragm which on its upper side is acted upon by the suction or underpressure in the suction conduit, and on its lower or underside by the controlling suction or underpressure of a pressure converter acting on said working diaphragm, in which arrangement said reducing diaphragm is rigidly connected to a push rod which penetrates through said working diaphragm, and wherein said push rod is provided with two closing or shutoff bodies, between which bodies there is disposed a double valve seat within the valve housing.

BRIEF DESCRIPTION OF THE DRAWING

FIG. 11 is a diagrammatic view of a modified circuit similar to that in FIG. 6.

DETAILED DESCRIPTION

Figure 5:
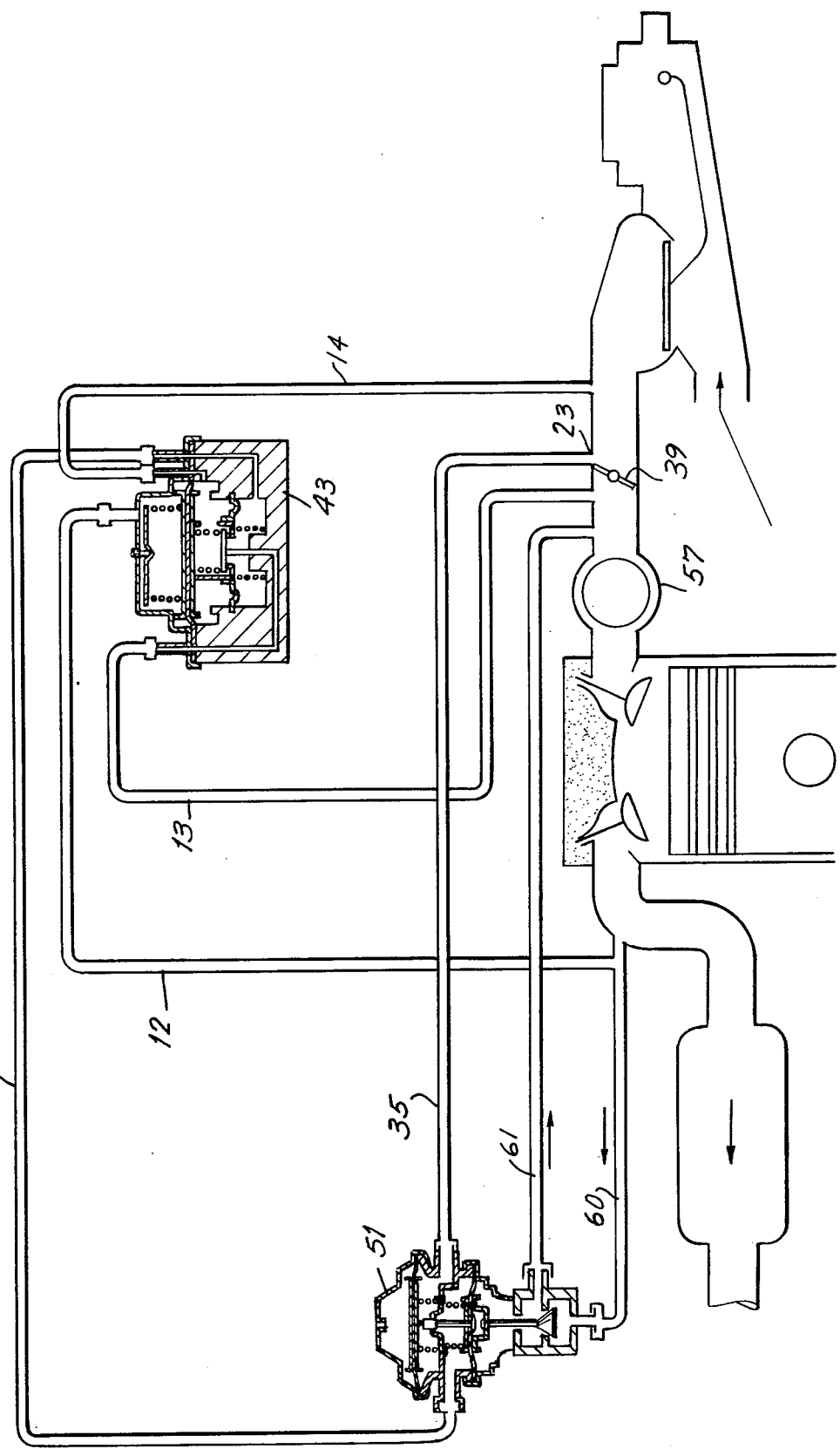
FIG. 5 is a diagrammatic view showing a circuit including a pressure converter and controlled EGR-valve for an engine with continuous fuel injection.

Referring briefly to FIG. 5 therein is shown a circuit diagram including an EGR-valve 51 and a pressure converter 43 connected to an internal combustion engine, the EGR-valve controlling the recycle of exhaust gases from conduit 60 extending from the exhaust manifold of the engine to conduit 61 leading to the suction conduit of inlet manifold 57. The inlet manifold has a number of tap-offs for conduits 14,35,61 and 13. Conduit 12 branches from conduit 60 and leads to converter 43. Conduit 15 connects the converter to the EGR-valve. The significance of the conduits and the internal construction of the EGR-valve and the converter 43 will be explained in detail later. For the present it is sufficient to realize that the EGR-valve is controlled by prevailing suction pressures and the operation of converter 43, to control, in turn, the recirculation of the exhaust gases back to the inlet manifold via conduits 60 and 61.

Figure 6:
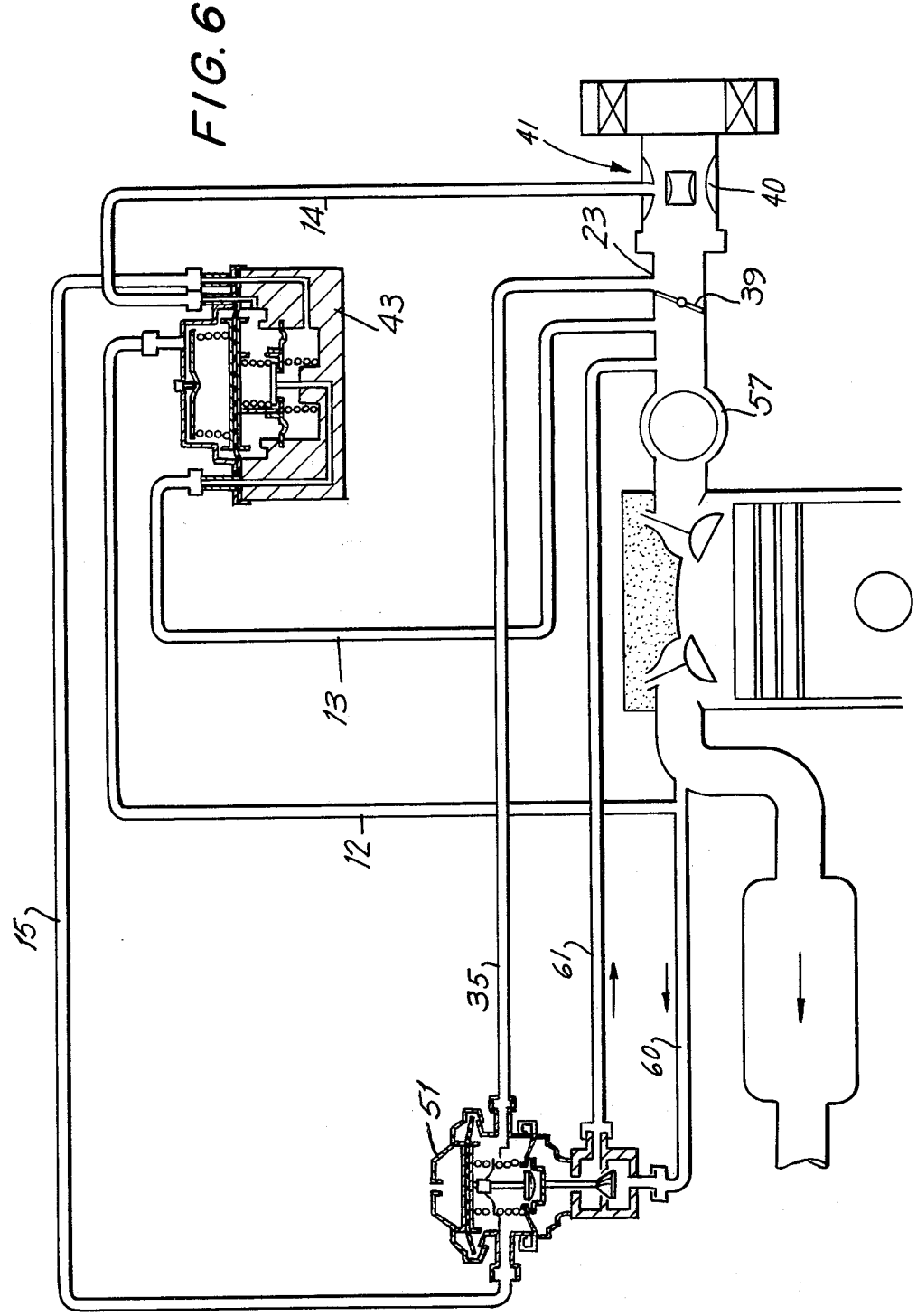
FIG. 6 is a diagrammatic view of a circuit including a pressure converter and a controlled EGR-valve for an engine with a carburetor.

FIG. 6 is similar to FIG. 5 and the same reference numerals are used, the exception being that FIG. 6 is concerned with a construction employing a carburetor 41 while FIG. 5 operates with a fuel injector. Conduit 14 in FIG. 6 is connected to the induction throat 40 of carburetor 41.

Figure 1:
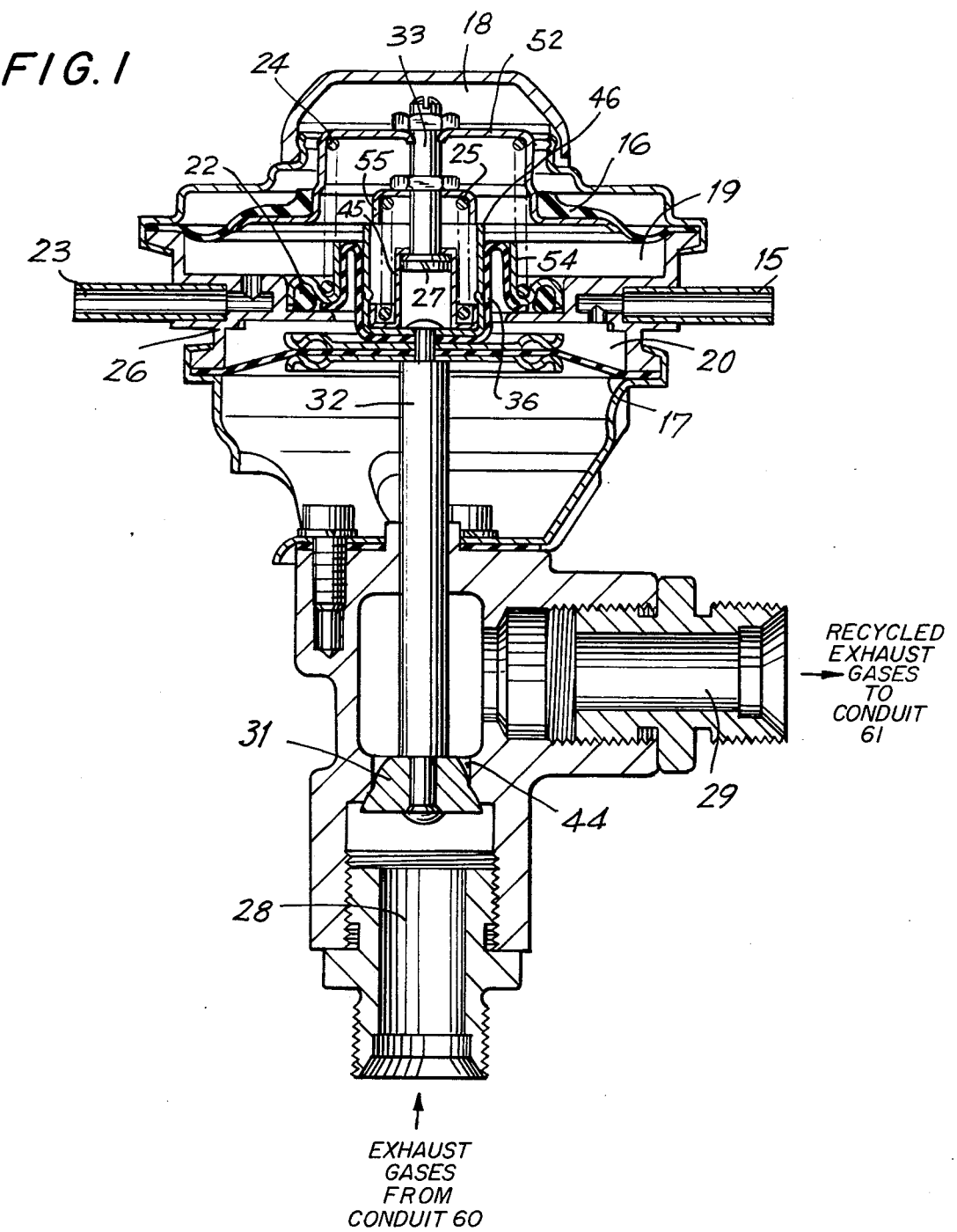
FIG. 1 is a sectional view of an EGR-valve with a reducing diaphragm.

The EGR-valve 51 shown in FIG. 1 comprises a reducing diaphragm 36 between a shut-off diaphragm 16 and a working diaphragm 17, the diaphragm 36 being acted on at its top surface by the suction-tube underpressure that acts on the diaphragm 16, while the bottom surface is acted on by the regulating underpressure of the air-pressure converter 43 that acts on the working diaphragm. The shut-off diaphragm 16 is rigidly connected to a coupling rod 33 by means of a diaphragm dish 52, the latter serving as a counter-bearing for the air shut-off spring 24. At its other side, the spring 24 bears against a holding plate 54 of the reducing diaphragm 36. The diaphragm 36 is rigidly connected to the working diaphragm 17 at a push rod 32, by means of a pot 46, at the inner surface thereof. On the coupling rod 33, there is mounted a working spring 25 which bears, at one end, against a spring dish 55 while the other end bears against the reducing diaphragm 36 and the working diaphragm 17 by means of a coupling pot 45, the latter being freely movable, in the regulating condition, with respect to the rod 33. A shut-off chamber 19 and a working chamber 20 are separated from each other within an intermediate part 26 by the reducing diaphragm 36 and a sealing element 22.

In the operating condition, the shut-off diaphragm 16 is urged towards intermediate part 26 by the suction pressure in the suction pipe 35 tapped off at a tapping point 23 (FIG. 5), namely against the force of shut-off pressure spring 24, while coupling 27 releases the working diaphragm 17.

A control pressure supplied from connecting pipe or conduit 15 prevails in working chamber 20.

The surface area of working diaphram 17 and the force of working spring 25 are dimensioned in such a way that sufficient adjusting forces are available for actuating push rod 32 secured to diaphragm 17 and valve body 31 thereon, said valve body 31 being displaced to its closing or shut-off position by an increase of the suction control pressure in chamber 20.

The diaphragm 36 is disposed between the shut-off chamber 19 and working chamber 20 in such a manner that its effective surface is acted upon by the difference between the suction pressure in the conduit 35 acting on shut-off diaphragm 16 and the control underpressure in conduit 15 acting on working diaphragm 17. This pressure difference acts on the effective surface of diaphragm 36 to effect a closing force on working diaphragm 17, which closing force reduces the amount of exhaust gas returned within the range of high suction pressures in the suction conduit 35 or even entirely eliminates the return of exhaust gas within the range of said suction pressures as will be explained in greater detail later.

The effect of diaphragm 36 is promoted by the fact, that closing or shut-off body 31 is disposed between inlet chamber 28 and discharge chamber 29 in such a way that it closes in the direction of flow of recycled exhaust gases against the valve aperture 44. This causes the pressure drop on the valve to provide an additional closing force.

In greater detail, the shut-off diaphragm 16 is rigidly connected to coupling rod 33 by means of diaphragm dish 52. The diaphragm dish 52 serves as an abutment for shut-off spring 24 supported on its other side in holding plate 54 of the reducing diaphragm 36 rigidly connected at its inner clamping edge with working diaphragm 17 on push rod 32 by means of pot 46. Working spring 25 is engaged on coupling rod 33 at one end and on spring dish 55 on its other end, said spring dish being coupled to the working diaphragm 17 by means of coupling pot 45 which is freely movable in the controlling condition above the coupling rod 33.

Figure 2:
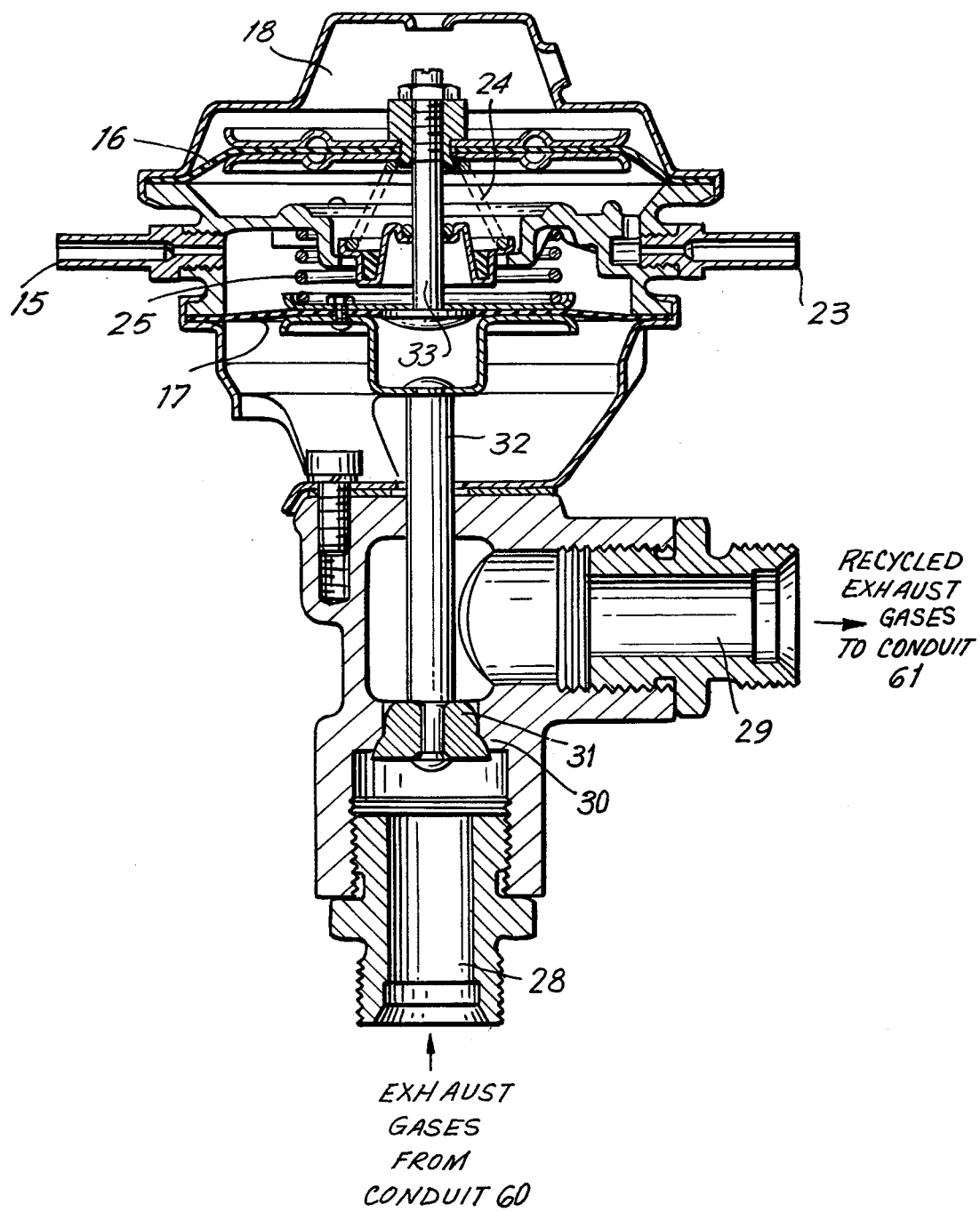
FIG. 2 is a sectional view of an EGR-valve without a reducing diaphragm.
Figure 3:
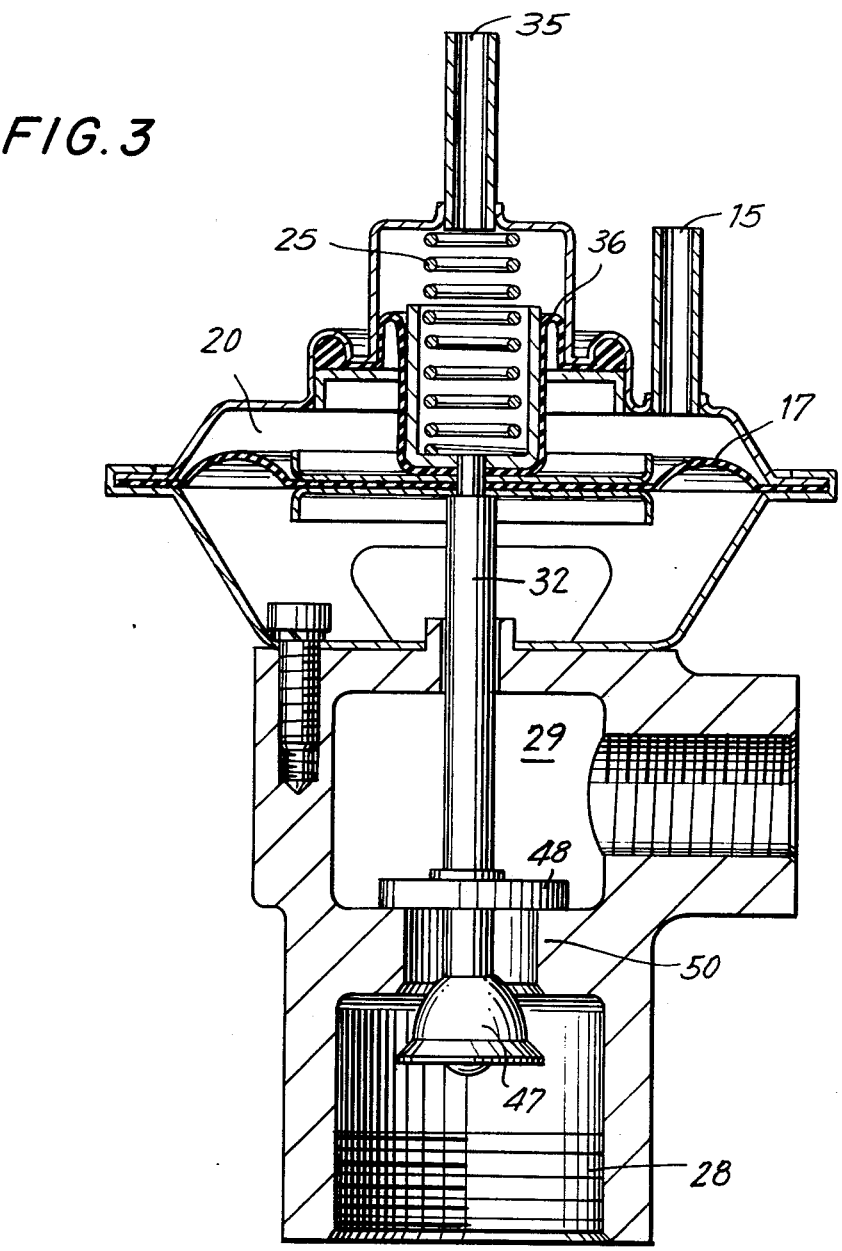
FIG. 3 is a sectional view of an EGR-valve without a shutoff or cutoff diaphragm.
Figure 8:
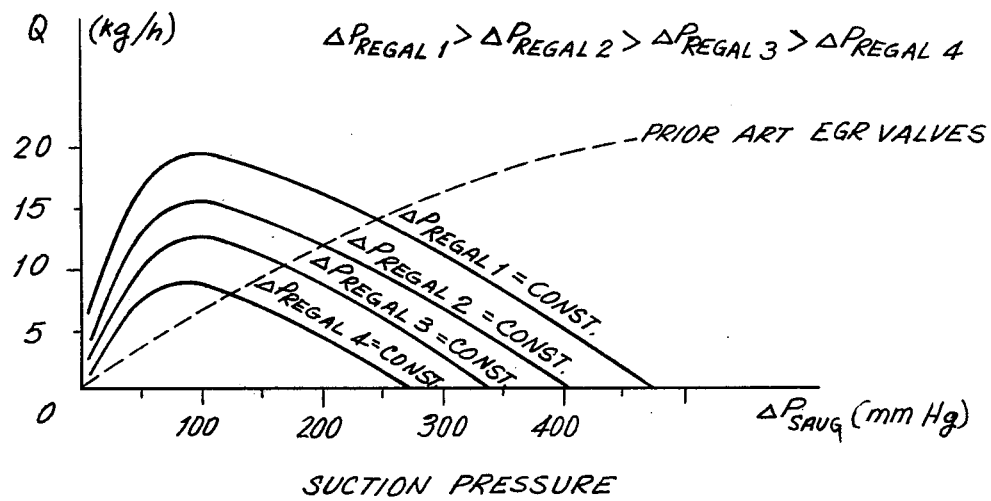
FIG. 8 is a graph of the characteristic closing or shut-off curve of the EGR-valve.

FIG. 8 shows the characteristic closing curves of a valve according to FIGS. 1 to 3 in comparison with EGR-valves as they are presently known.

When the suction pressure in the suction conduit 35 falls below a predetermined value, the shutoff diaphram 16 is displaced by the excess force of shutoff spring 24, and the working diaphragm 17 is pulled into the closing or shutoff position by coupling rod 27.

Figure 10:
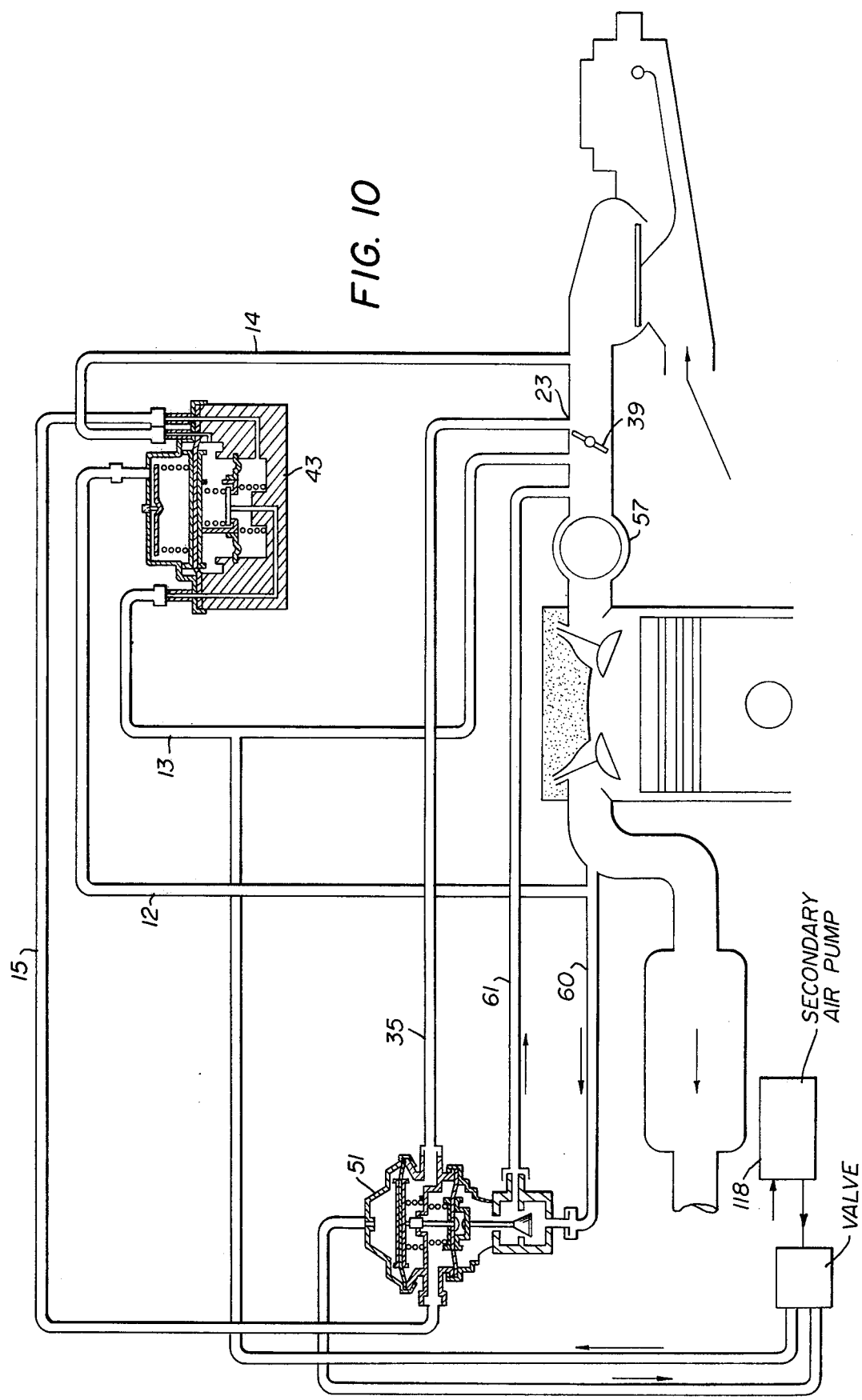
FIG. 10 is a diagrammatic view of a modified circuit similar to that in FIG. 5.

The shutoff function may also be effected as shown in FIG. 10 by admitting pressure medium into upper venting chamber 18 for opening shutoff body 31 in addition to the effect of the suction pressure applied to conduit 35, or by exclusively admitting pressure medium into said venting chamber and evacuating said upper venting chamber for the closing of the EGR-valve, using for this purpose, if desired, the pressure of a secondary air pump 118 of an air compressor system as is customarily utilized for oxidizing the noxious substances contained in the exhaust gases.

The shutoff arrangement is effective in the completely pressure-free condition of the valve (when the engine is shut off) to cause said closing body 31 to be displaced to its closing position by shutoff spring 24 against the effect of working spring 25.

In order to prevent the valve from temporarily opening during engine start-up, tapping point 23 is disposed upstream of throttle valve 39 as shown in FIGS. 5 and 6 in inlet manifold 57 such that no suction pressure exists in shutoff chamber 19 during engine idling.

In a variation of the EGR-valve according to FIG. 2 where similar elements have the same reference numerals, the closing effect of reducing diaphragm 36 is omitted, and the closing effect is achieved exclusively through a respective dimensioning of the sealing surface on closing body 31. In this embodiment, the surface area of shutoff diaphragm 16 and the force of shutoff spring 24 are dimensioned in such a way that when the suction pressure applied or admitted by way of conduit 35 falls below a predetermined value, the excess force of shut-off spring 24 will urge closing body 31 into its closing position by way of coupling rod 33 against the excess force of working spring 25.

The closing of the valve may also be effected in another variation according to FIG. 3 by disposing, in a known manner, a second closing body 48 and an associated valve seat 50 in such a way that when the suction control pressure falls or decreases to a minimum value corresponding to the full load, or is entirely eliminated when the engine is not operated, the valve will close again.

This simpler construction may be utilized for engines which, during starting, can withstand a brief recycle of exhaust gas.

Figure 4:
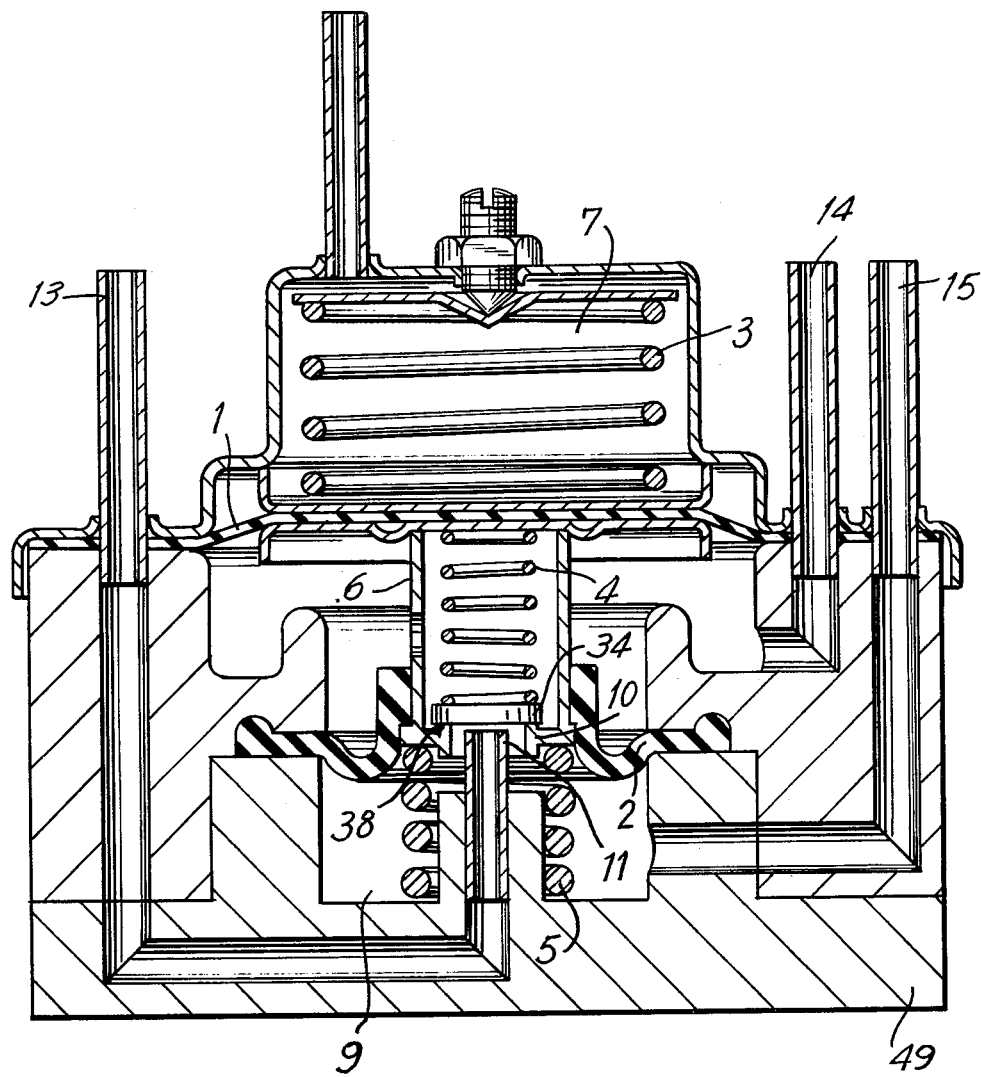
FIG. 4 is a sectional view of a pressure converter.

In the pressure converter 43 according to FIG. 4, the exhaust gas counter pressure acts via conduit 12 on primary diaphragm 1, and thus produces an effective force which is transmitted by way of coupling 6 and secondary diaphragm 2 to pressure spring 5 disposed on the secondary side. The diaphragm 2 is clamped between dishes of the converter body.

At a constant condition of operation, the diaphragm forces of the primary and secondary diaphragms 1 and 2 are in a state of balance with the spring forces of pressure spring 5 and adjusting spring 3.

When the exhaust gas counter pressure changes, said balance is disturbed, whereby a movement of the two diaphragms is produced.

When said exhaust gas counter pressure increase, said diaphragms are displaced against the force of pressure spring 5, which displacement causes valve plate 34 of valve arrangement 38 to be released from ventilation valve seat 10 and pressed against underpressure seat of fixed tubular member 11 by the force of valve spring 4. The opening of the ventilation cross section so effected permits the flow of air into the secondary chamber 9 of pressure converter 43, which converter is connected to the working chamber 20 of the EGR-valve by way of conduit 15. The flow of air now causes a drop of suction pressure in secondary space 9 which continues until an equilibrium of forces has been re-established and ventilation valve seat 10 has again been closed.

With decrease of the exhaust gas counter pressure, the pressure spring 5 will displace the two diaphragms 1 and 2 in an analogous manner such that the valve seat 11 is open, and air is sucked off until the resulting increase in underpressure has re-established the equilibrium of forces, and valve seat 11 has again been closed. The underpressure valve seat 11 and ventilation valve 10 are closed under constant conditions, so that no flow of air passes through pressure converter 43 under said conditions, i.e. the latter works without air consumption.

Figure 7:
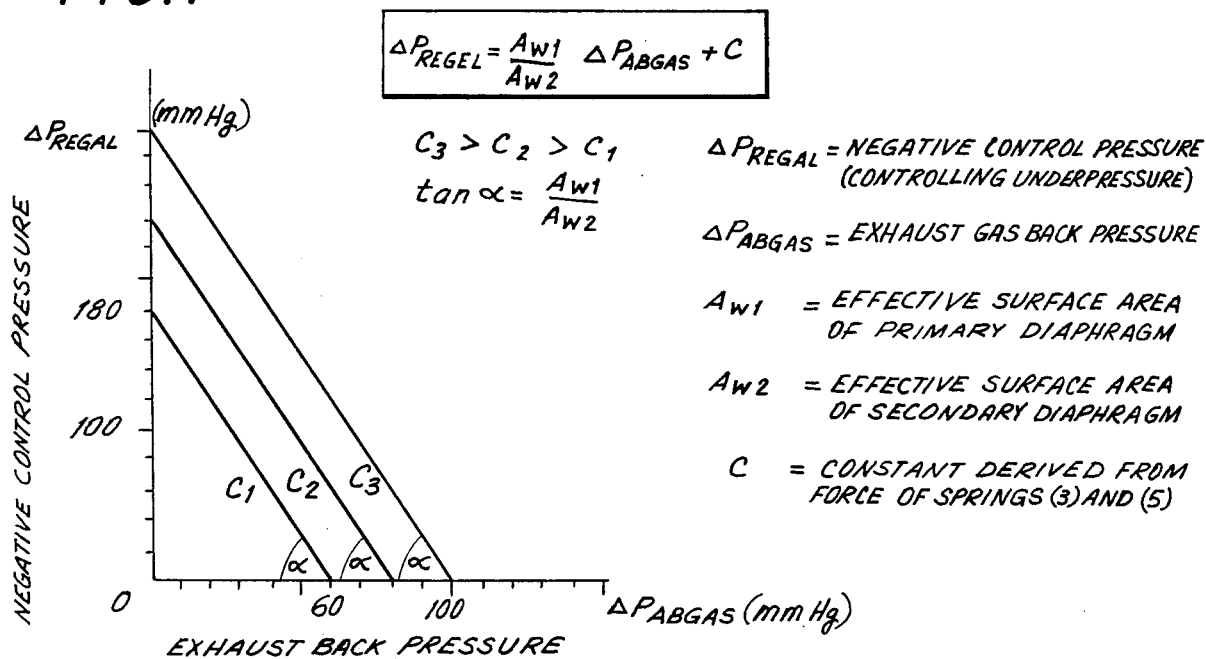
FIG. 7 is a graph of characteristic curves of the pressure converter.

A defined alteration of the exhaust gas counter pressure on the primary side causes a change of the suction control pressure on the secondary side which, in relation to the ratio of effective surfaces of primary diaphragm 1 to secondary diaphragm 2, is larger than the change in exhaust gas counter pressure. The shape of the characteristic curve of pressure converter 43 is such that suction control pressure decreases with increase in exhaust gas counter pressure. The characteristic curves of the pressure converter are illustrated in FIG. 7.

The decreasing characteristic has the advantage that the suction control pressure becomes lower within the range of higher power output and higher medium pressures, which means that also the suction control pressure in the suction conduit required for amplification purposes may assume lower values. It is thus possible to adapt pressure converter 43 in such a way that the suction conduit suction pressure present under any operating conditions of the engine will be sufficient for such amplification. A suction pressure reservoir may be omitted for that reason.

Under certain operating conditions of the engine, for example under low ambient temperatures, it is useful if the return of the exhaust gas is switched off by means of external presetting or pre-controlling devices. These pre-controlling devices are disposed in a further embodiment of the present invention in conduit 35 in such a way that when the control signal occurs, the suction pressure from tapping point 23 will not be passed through to shutoff diaphragm 16, whereby closing body 31 is maintained in its shutoff position.

The usability of the presssure converter is not limited to the above-described embodiment in which the exhaust gas counter pressure is utilized as the controlling signal.

Instead of using the exhaust gas counter pressure, it is also possible as shown in FIG. 11 to admit a suction pressure which increases with the gas flow rate, for example, applying an underpressure from the Venturi by way of conduit 14 to the underside of primary diaphragm 1, which will produce the same decreasing characteristic curve of the control pressure in the secondary space.

It is likewise possible to form an overpressure which increases with the mixture rate in the form of a pressure head, or dynamic pressure in a dynamic pressure outlet nozzle 112, which may be admitted like the exhaust gas counter pressure to the upper side of primary diaphragm 1 by way of conduit 12'.

In the further variation of the present invention FIG. 11, the dynamic pressure may be admitted by way of conduit 12 to the upper side of primary diaphragm 1, while Venturi underpressure is supplied by way of line 14 to the lower side of said primary diaphragm 1.

It is also possible as illustrated in FIG. 6 to admit the exhaust gas counter pressure to the upper side, and Venturi underpressure to the lower side of said diaphragm.

A preferred embodiment of the present invention, according to FIG. 5 contemplates admitting, by way of conduit 14, an underpressure to the lower side of primary diaphragm 1. This underpressure has a nearly constant value under constant operating conditions of the engine at any mixture rate, however, a change in the mixture rate will cause it value to change in such a manner that this value will increase when the mixture rate increases (for example, during acceleration), and fall below the value present under the constant operating condition when said mixture rate decreases (for example, during slow downs and stopping). Such underpressure signals may be tapped, for example in the mixing chamber of costant-pressure carburetors, or in the space between the mixing chamber and the throttle valve. In continuous injection systems which operate with a measurement of the air volume, such an underpressure signal lies within the space between the variable flow resistance effecting the measurement of the air volume, and throttling valve 39, in the so-called air conduct housing. This variation of the present invention offers the special advantage that by changing said underpressure signal as a result of changes in the mixture rate, the amount of exhaust gas returned is increased with such increases in mixture rate, for example during acceleration, above the value applicable during constant engine operations, and reduced below said value of the amount of exhaust gases returned when said mixture rate decreases, for example, during slowdown and stopping.

This effects an optimal reduction of the nitrogen oxide emissions, particularly during acceleration periods, and only minimal increase of the fuel consumption due to the reduced amount of exhaust gases returned under constant driving conditions and particularly under operating conditions of engine braking (slowdown), and due to said reduction of the amount of exhaust gases returned under engine braking conditions, the occurrence of hydrocarbon emissions is reduced to a substantially lesser degree than such emissions in EGR-systems which return larger amounts of exhaust gas to the air intake also under these operating conditions.

Solely by applying such an underpressure signal without exhaust gas counter pressure or control pressure, one obtains an EGR-system which exclusively returns exhaust gases during acceleration phases.

Figure 9:
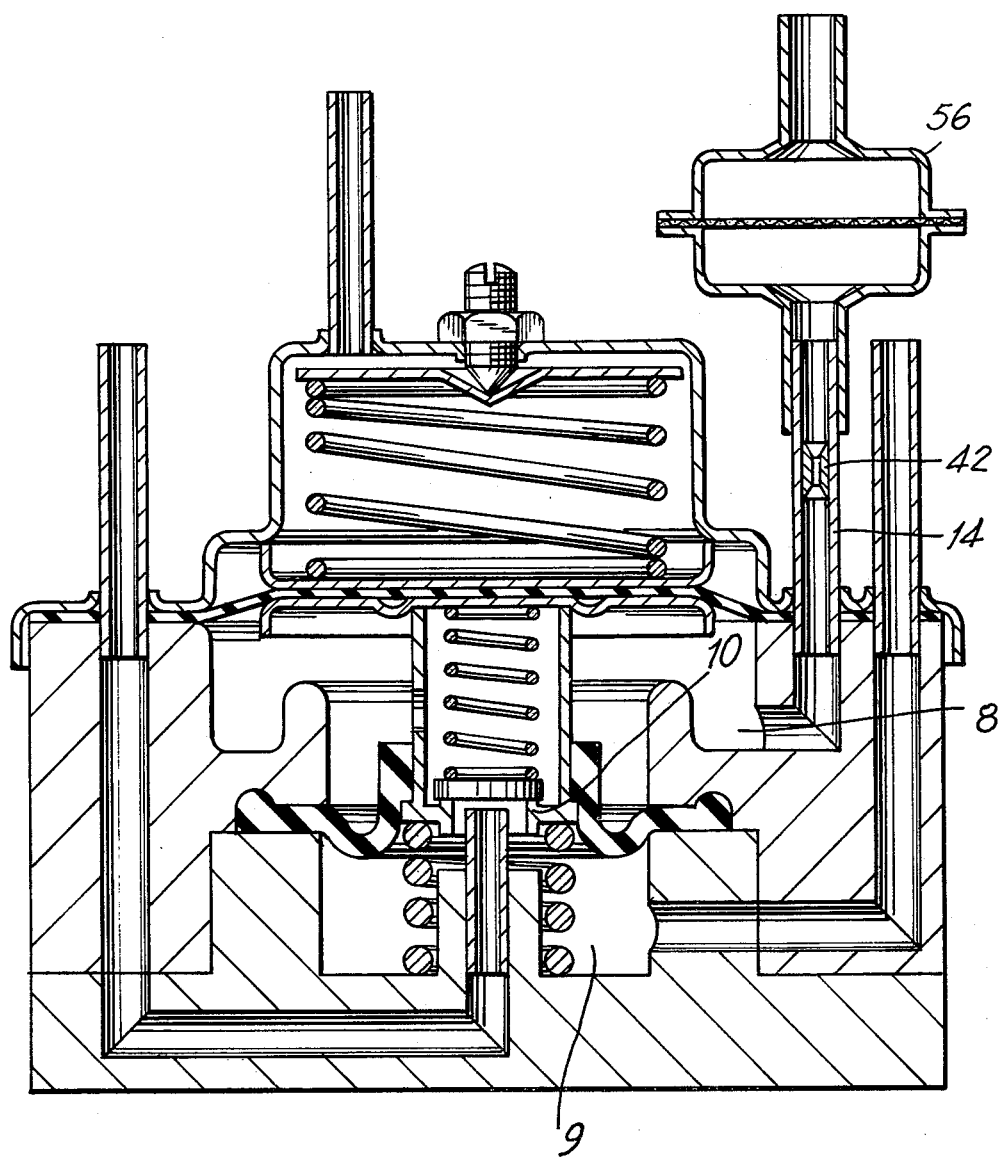
FIG. 9 is a sectional view of the pressure converter with a filter element.

In connection with engines in which such an underpressure signal characterizing the non-uniform operation is not available, it is possible to achieve, according to a further embodiment of the present invention shown in FIG. 9, an effect by means of a throttling resistance 42 in conduit 14, which will temporarily increase the rate of exhaust gas returned with any increase of mixture rate. This is achieved by providing an arrangement in which air flow for a short period from intermediate chamber 8 by way of ventilation valve seat 10 into secondary chamber 9 when the suction control pressure in secondary chamber 9 of pressure converter 43 is adjusted to the changed input signal. This air flowing from intermediate chamber 8 requires a flow of air via conduit 14 and the throttle resistance disposed in said conduit causing a pressure loss in said resistance which produces, with the Venturi underpressure action according to FIG. 6, an increase of the underpressure in the intermediate chamber 8.

This underpressure, or said increase in underpressure, respectively, effects a further variation of the controlling underpressure, and thereby a further increase of the amount of exhaust gas returned. After the adjustment of the suction control pressure in secondary chamber 9 to the changed input signal (overpressure in primary chamber 7 and/or underpressure in intermediate chamber 8) has been completed, the underpressure also in intermediate space 8 will drop back to its preceding value, and the amount of exhaust gas returned into the system will be reduced again to the amount returned under constant engine operating conditions.

A filter 56 is disposed in conduit 14 upstream of throttling resistance 42, such that conduit 14 can be ventilated atmospherically by means of the filter.

What is claimed is:

1. Apparatus for recycling exhaust gas for an internal combustion engine having inlet and outlet manifold, said apparatus comprising an EGR-valve including a plurality of diaphragms defining first and second chambers separated by one diaphragm, the second chamber being a working chamber, means for subjecting said first chamber to suction pressure prevailing in the inlet manifold of the engine, a pressure converter having a first inlet connected to the inlet manifold for being subjected to the suction pressure therein, a second inlet connected to the inlet manifold for being subjected to a control suction pressure, an outlet connected to said working chamber of the EGR-valve and valve means for selectively connecting the outlet to said second inlet in accordance with the suction pressure prevailing at said first inlet, said EGR-valve further comprising recycle means coupled to said inlet and outlet manifolds for recycling engine exhaust gases, and coupling means between said diaphragms and said recycle means for controlling the operation of said recycle means in accordance with the pressures in said chambers such that at low engine loads the amount of recycled gas is proportionately reduced in relation to engine air-fuel mixture rate to provide a lower ratio of recycled fuel to mixture rate at low loads as compared to the ratio at high loads.

2. Apparatus as claimed in claim 1 wherein said diaphragms are three in number inclusive of a shutoff diaphragm, a working diaphragm and a reducing diaphragm disposed between the shutoff diaphragm and the working diaphragm, said one chamber being a shutoff chamber disposed between the shutoff diaphragm and the reducing diaphragm, said working chamber being disposed between the reducing diaphragm and the working diaphragm.

3. Apparatus as claimed in claim 2 wherein said coupling means comprises a coupling rod, a first diaphragm dish fixed to said rod and rigidly connected to said shutoff diaphram, a shutoff spring bearing at one end against said diaphragm dish, a second diaphragm dish having an outer end fixed to said reducing diaphragm and supporting the other end of said shutoff spring, said second diaphragm dish having an inner end fixed to said working diaphragm, a push rod secured to said working diaphragm, a coupling pot secured to said working diaphragm and slidably connecting the coupling rod and push rod, and a working spring acting on said coupling rod and said coupling pot.

4. Apparatus as claimed in claim 3 wherein said recycle means comprises an inlet connected to the exhaust manifold for receiving exhaust gases therefrom an outlet connected to the inlet manifold for recycling exhaust gases thereto, and a closure member connected to said push rod for selectively closing communication between the inlet and outlet of the recycle means.

5. Apparatus as claimed in claim 4 wherein said inlet of the recycle means is disposed below said closure member and said outlet of the recycle means above said closure member is disposed in the direction of flow of the exhaust gases from the inlet to the outlet.

6. Apparatus as claimed in claim 1 wherein said pressure converter comprises a primary diaphragm subjected to exhaust gas pressure on one side thereof, a coupling member fixed to said primary diaphragm, a secondary diaphragm fixed to said coupling member and having a smaller surface area than said primary diaphragm, said primary and secondary diaphragms defining an operating chamber, first and second springs respectively acting on said primary and secondary diaphragms to urge the same towards one another, said coupling member being hollow, said valve means comprising a valve plate, said coupling member having an aperture with a valve seat, a spring urging said valve plate on said valve seat, a fixed inner valve seat disposed within said aperture and connected to said first inlet, said second inlet being in communication with said operating chamber to furnish the control suction pressure thereto, and an outlet conduit connecting said outlet of the pressure converter with said aperture for supplying control suction pressure to said working chamber of the EGR in dependence on the position of the valve plate relative to the inner and outer valve seats.

7. Apparatus as claimed in claim 6 comprising a throttle valve in said inlet manifold, said second inlet being connected to said inlet manifold upstream of said throttle valve.

8. Apparatus as claimed in claim 6 wherein the engine is provided with a carburetor having an induction throat, said second inlet being connected to said induction throat.

9. Apparatus as claimed in claim 6 comprising a fixed throttle upstream of said second inlet to said pressure converter.

10. Apparatus as claimed in claim 9 comprising a filter between said fixed throttle and said inlet manifold.

11. Apparatus as claimed in claim 1 wherein said diaphragms are two in number inclusive of a working diaphragm and a reducing diaphragm, said reducing diaphragm being disposed above said working diaphragm, said reducing diaphragm being subjected on its upper surface to the suction pressure in said inlet manifold, said working chamber being between said two diaphragms and being subjected to the control suction pressure at said outlet of the pressure converter, said coupling means comprising a push rod rigidly connected to said reducing diaphragm, and passing through said working diaphragm, two closure bodies secured to said push rod for respectively closing said recycle means.

* * * * *

UNITED STATES PATENT OFFICE
CERTIFICATE OF CORRECTION

Patent No. 4,056,084　　　　　　　　　Dated November 1, 1977

Inventor(s) Hans Baumgartner

It is certified that error appears in the above-identified patent and that said Letters Patent are hereby corrected as shown below:

The following priority data should appear on title page:

Germany　　　　　　June 27, 1975　　　　　2528760

*Signed and Sealed this*

*Twenty-fifth* Day of *April 1978*

[SEAL]

*Attest:*

RUTH C. MASON　　　　　　　LUTRELLE F. PARKER
*Attesting Officer*　　　　　*Acting Commissioner of Patents and Trademarks*